MICROWAVE POWER SOURCE INCLUDING PLURAL WAVE-BEAM INTERACTION CIRCUITS WITH A PLURALITY OF FEEDBACK CIRCUIT MEANS INCLUDING A COMMON RESONANT CAVITY

Filed March 16, 1964 3 Sheets-Sheet 1

INVENTOR.
JOHN E. NEVINS JR.,
BY Paul M. Coble
ATTORNEY.

Dec. 20, 1966 J. E. NEVINS, JR 3,293,563

MICROWAVE POWER SOURCE INCLUDING PLURAL WAVE-BEAM INTERACTION CIRCUITS WITH A PLURALITY OF FEEDBACK CIRCUIT MEANS INCLUDING A COMMON RESONANT CAVITY

Filed March 16, 1964 3 Sheets-Sheet 2

INVENTOR.
JOHN E. NEVINS JR.,
BY Paul M. Cobb
ATTORNEY.

MICROWAVE POWER SOURCE INCLUDING PLURAL WAVE-BEAM INTERACTION CIRCUITS WITH A PLURALITY OF FEEDBACK CIRCUIT MEANS INCLUDING A COMMON RESONANT CAVITY

Filed March 16, 1964

INVENTOR.
JOHN E. NEVINS JR.,
BY Paul M. Coble
ATTORNEY.

3,293,563
Patented Dec. 20, 1966

3,293,563

MICROWAVE POWER SOURCE INCLUDING PLURAL WAVE-BEAM INTERACTION CIRCUITS WITH A PLURALITY OF FEEDBACK CIRCUIT MEANS INCLUDING A COMMON RESONANT CAVITY

John E. Nevins, Jr., Los Angeles, Calif., assignor to Hughes Aircraft Company, Culver City, Calif., a corporation of Delaware Filed Mar. 16, 1964, Ser. No. 352,151
8 Claims. (Cl. 331—82)

This invention relates to microwave devices, and more particularly relates to a microwave power generating device including a plurality of traveling wave-electron beam interaction circuits having a common feedback circuit.

The generation of high power microwave signals at higher frequencies, especially those in the millimeter wavelength region, has recently become of great interest in microwave tube technology. The problem has been a difficult one, because while wave propagating circuitry of small dimensions is needed to support these higher frequencies, this small size necessarily imposes a limitation on the level of power achievable.

Accordingly, it is an object of the present invention to provide a device for generating high frequency microwave power at greater power levels than has heretofore been practical.

It is a further object of the present invention to provide a microwave frequency oscillator, especially suitable for operation at millimeter wavelengths, which provides either a plurality of coherent individual output signals or a combined output signal of higher power.

In accordance with the foregoing objects, the microwave power source according to the present invention includes means for providing a plurality of streams of electrons along a plurality of respective predetermined paths and a plurality of slow-wave structures each disposed along and about one of the electron stream paths for propagating electromagnetic wave energy in such manner as to provide interaction between the electron streams and the respective electromagnetic waves propagated along the respective slow-wave structures. A feedback circuit including means such as a cavity which is resonant at the frequency at which output microwave power is to be provided removes electromagnetic wave energy at this frequency from one region of each of the slow-wave structures and applies it in regenerative fashion to another region of each of the slow-wave structures. In one embodiment of the present invention output circuitry combines the output electromagnetic waves from each of the slow-wave structures to form a composite output signal of higher power, while in another embodiment separate output signals are provided from the individual slow-wave structures.

Other and further objects, advantages, and characteristic features of the present invention will become readily apparent from the following detailed description of preferred embodiments of the invention when taken in conjunction with the accompanying drawings in which.

Figure 1:
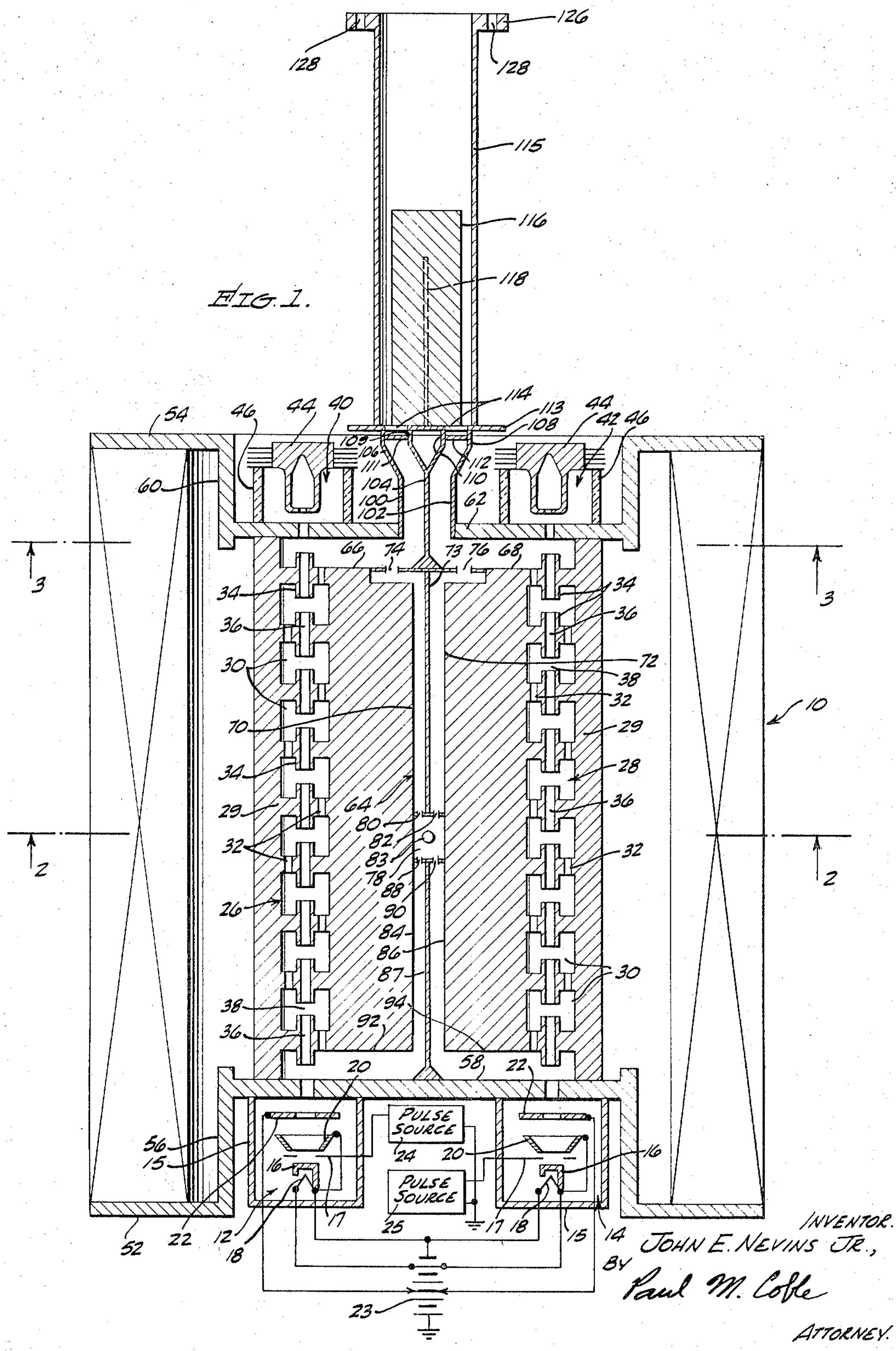
FIG. 1 is a longitudinal sectional view of a microwave power generating device according to one embodiment of the present invention.
Figure 2:
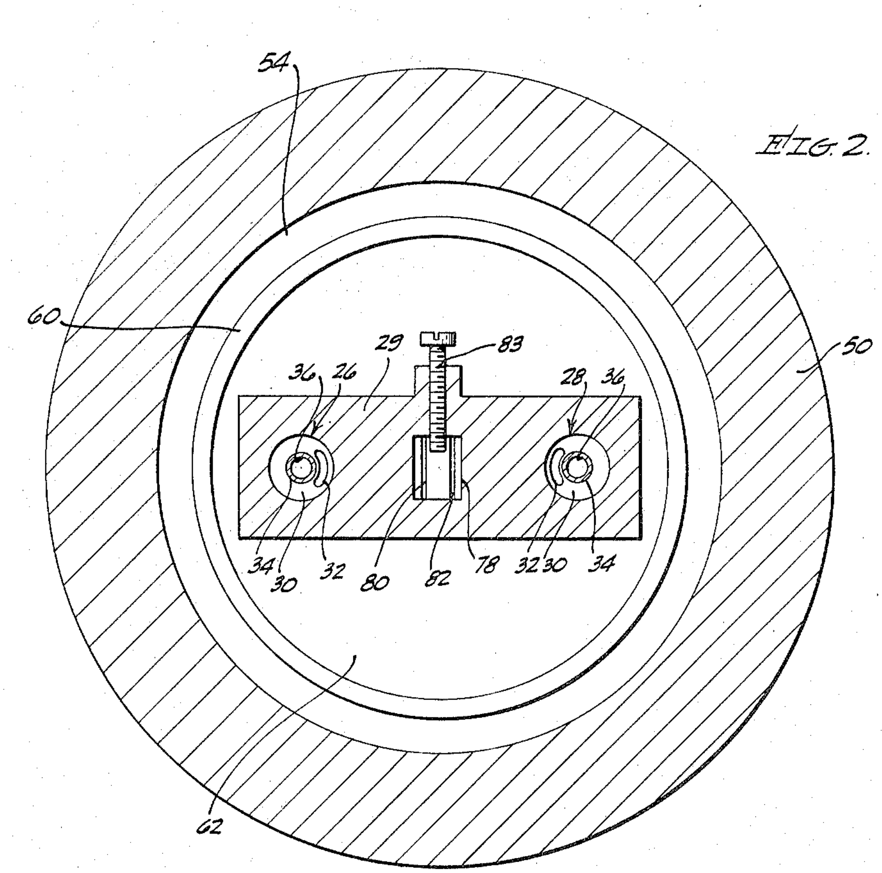
FIG. 2 is a cross-sectional view taken along line 2—2 of FIG. 1.
Figure 4:
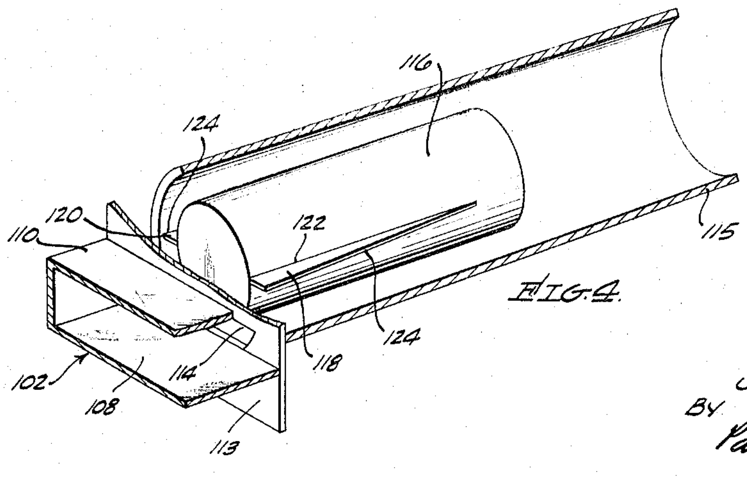
FIG. 4 is a broken away perspective view of the output signal combining circuitry of the device of FIG. 1.

Referring with more particularity to the drawings, in FIG. 1 there is shown a microwave power source designated generally by the numeral 10 which includes first and second electron guns 12 and 14 disposed at one end of the device 10, with each gun functioning to launch an electron stream along a predetermined path parallel to the longitudinal axis of the device 10. The electron guns 12 and 14 are identical, and each includes a housing 15 within which there is disposed an electron emitting cathode 16, a control grid 17, a filamentary heater 18, a focusing electrode 20, and an accelerating anode 22. A voltage source 23 is tapped at appropriate potentials, as shown, to provide operating voltages for the heater 18 and the electrodes 16, 20 and 22. Pulse sources 24 and 25 are coupled to the respective control grids 17 of the electron guns 12 and 14 in order to turn on and cut off the electron beams generated by the respective guns 12 and 14.

Disposed along and about each electron beam path is a slow-wave structure which propagates electromagnetic wave energy with a phase velocity substantially less than the velocity of light so that energy exchange is provided between each electron beam and the electromagnetic wave propagated therealong. In the device of FIG. 1, a pair of slow-wave structures 26 and 28 having substantially the same electromagnetic wave propagating characteristics are disposed substantially parallel to and coextensive with one another. Each slow-wave structure 26 and 28 comprises a metallic housing 29 which defines a series of cylindrical interaction cells, or cavities, 30 disposed sequentially along the respective electron beam paths. For interconnecting adjacent interaction cavities 30 an off-center coupling hole 32 is provided through each portion of the housing 29 which serves as an end wall separating adjacent cavities to permit the transfer of electromagnetic wave energy from cavity to cavity. As is illustrated, the coupling holes 32 may be substantially kidney-shaped and may be alternately disposed 180° apart with respect to the axis of the slow-wave structure. It is pointed out, however, that the coupling holes 32 may be of other shapes and may be staggered in various other arrangements well known in the art. The end walls of the respective interaction cavities 30 are constructed in such manner that short drift tubes, or ferrules, 34 are provided which protrude along the electron beam path outwardly from both surfaces of the respective end walls and into the interaction cavities 30. The drift tubes 34 of each slow-wave structure are provided with central and axially aligned apertures 36 to provide a passage for the flow of the associated electron beam. Adjacent ones of the drift tubes 34 are separated by a gap 38 in which energy exchange between the electron beam and the traveling-wave energy traversing the slow-wave structure occurs.

At the ends of the slow-wave structures 26 and 28 remote from the electron guns 12 and 14, respective collector assemblies 40 and 42 are provided for intercepting the electrons of the respective beams and dissipating their kinetic energy. Each collector arrangement 40 and 42 includes a finned collector electrode 44 mounted along the electron stream path within a short ceramic tube 46 and brazed to the ceramic tube 46.

For constraining the respective electron beams to flow in narrow, well-collimated parallel paths, a tubular magnet 50, which may be either a permanent magnet or a solenoid energized from an appropriate source of potential (not shown), is disposed symmetrically about the slow-wave structures 26 and 28 with its axis aligned with the longitudinal axis of the device 10. Pole pieces 52 and 54 of a ferromagnetic material such as high purity iron are provided at the respective ends of the magnet 50 in order to guide the magnetic lines of flux to the vicinity of the electron beams. As is shown, the pole piece 52 defines a longitudinally inwardly extending tubular portion 56 symmetrically disposed about the electron guns 12 and 14 and a circular portion 58 extending radially inwardly from the tubular portion 56 between the electron guns 12 and 14 and the slow-wave structures 26 and 28. Similarly, the pole piece 54 defines a longitudinally inwardly extending tubular portion 60 symmetrically disposed about the collector arrangements 40 and 42 and a centrally apertured circular portion 62 extending radially inwardly from the tubular portion 60 between the slow-wave structures 26 and 28 and the collector arrangements 40 and 42.

In order to enable the slow-wave circuits 26 and 28 to propagate signals which oscillate at the same frequency, a high Q feedback circuit designated generally by the numeral 64 is provided which removes amplified electromagnetic wave energy at a preselected frequency from the output ends of the slow-wave structures 26 and 28 and regeneratively applies this energy to the input ends of the slow-wave structures. Like rectangular waveguides 66 and 68 are coupled to the interaction cavities 30 at the ends of the respective slow-wave structures 26 and 28 adjacent the collector arrangements 40 and 42 to carry amplified electromagnetic waves radially inwardly from the respective slow-wave structures 26 and 28. A pair of like longitudinally extending rectangular waveguides 70 and 72 are provided, with a common broad wall 73 of the waveguides 70 and 72 disposed in a plane passing through the longitudinal axis of the device 10. One end of the waveguide 70 is coupled to the transverse waveguide 66 via a coupling iris 74, while the adjacent end of the waveguide 72 is coupled to the transverse waveguide 68 via a coupling aperture 76. The other ends of the longitudinal waveguides 70 and 72 are coupled to a rectangular cavity 78 by means of respective irises 80 and 82 in the end wall of the cavity 78 nearer the collector end of the device. The dimensions of the cavity 78 are made such that the cavity 78 is sharply resonant at the preselected frequency at which the device 10 is to provide output signals. A tuning element 83, having a variable depth of penetration into the resonant cavity 78 in a direction perpendicular of the longitudinal axis of the device 10, is provided to vary the resonant frequency of the cavity 78 and thereby alter the frequency at which oscillations are provided. A second pair of like longitudinally extending rectangular waveguides 84 and 86, having a common broad wall 87 disposed in a plane passing through the longitudinal axis of the device 10, each have one end coupled to the resonant cavity 78 via respective coupling irises 88 and 90 in the end wall of the cavity 78 nearer the electron gun end of the device 10. Radially extending like rectangular waveguides 92 and 94 adjacent the circular portion 58 of the pole piece 52 respectively couple the other ends of the longitudinal waveguides 84 and 86 with the interaction cavities 30 at the ends of the respective slow-wave structures 26 and 28 adjacent the electron guns 12 and 14.

In the embodiment illustrated in FIG. 1 the output signals from the slow-wave structures 26 and 28 are combined in order to form a composite output signal. A pair of like rectangular waveguides 100 and 102, having a common broad wall 104 disposed in a plane passing through the longitudinal axis of the device 10, extend through the central aperture in the pole piece portion 62 and are respectively coupled to the radially inner ends of the transverse waveguides 66 and 68. The broad walls of the waveguides 100 and 102 diverge outwardly so that the waveguides 100 and 102 have respective outer broad walls 106 and 108 and inner broad walls 109 and 110 which are all spaced from and disposed parallel to and coextensive with one another in the region where the waveguides 100 and 102 project longitudinally beyond the pole piece 54 at the collector end of the device 10. Window elements 111 and 112 of a dielectric material such as forsterite, alumina, or mica are disposed in the respective waveguides 100 and 102 near their outer ends. The windows 111 and 112, while being transparent to electromagnetic wave energy, are able to support a pressure differential between their broad sides so that the interaction and waveguiding circuitry within the device 10 may be operated in an evacuated atmosphere. An apertured electrically conductive plate 113 is disposed against the outer ends of the waveguides 100 and 102 in a plane perpendicular to the longitudinal axis of the device 10.

Abutting the apertured plate 113 is a tubular waveguide 115 having its longitudinal axis aligned with the longitudinal axis of the device 10. The apertures 114 in the plate 113 are such that an opening is provided between the tubular waveguide 115 and each of the rectangular waveguides 100 and 102 only in the regions where the cross-sections of the interior waveguiding portions of these waveguides overlap. Thus electromagnetic communication is provided between the tubular waveguide 115 and each of the waveguides 100 and 102, with the travel of energy through the non-overlapping waveguide portions being prevented by the plate 113. The inner diameter of the tubular waveguide 115 is slightly greater than the distance between the outer broad walls 106 and 108 of the respective rectangular waveguides 100 and 102. The tubular waveguide 115 is disposed such that one of its axial diametrical planes passes through the common broad wall 104 of the rectangular waveguides 100 and 102 and is equidistant from and parallel to the inner broad walls 109 and 110 of the repective waveguides 100 and 102. An electrically conductive cylindrical probe 116 is coaxially disposed within the tubular waveguide 115, with an end of the probe 116 abutting the plate 113. The diameter of the cylindrical probe 116 is greater than the distance between the inner broad walls 109 and 110 and less than the distance between the outer broad walls 106 and 108 of the rectangular waveguides 100 and 102, respectively.

Mounted in the space between the probe 116 and the tubular waveguide 115 on diametrically opposite sides of the probe 116 and in the axial diametrical plane thereof which passes through the common broad wall 104 are first and second triangular fins 118 and 120 of electrically conductive material. The fins 118 and 120 each have an inner longitudinal edge 122 contacting the cylindrical probe 116 for a predetermined distance therealong and have an outer longitudinal edge 124 which contacts the tubular waveguide 115 at its end abutting the plate 113. However, each outer longitudinal edge 124 extends along the hypotenuse of the triangle defined by the fin toward the inner longitudinal edge 122. Thus, the width of each fin 118 and 120 gradually decreases as a function of longitudinal distance from the plate 113 from a maximum value essentially equal to the distance between the tubular waveguide 115 and the probe 116 to a value of essentially zero at the apex of the triangular fin. It is pointed out that while a triangularly shaped fin is preferred, the outer edge 124 need not lie in a straight line but may have other shapes such as exponential, so long as the width of the fin decreases as a function of longitudinal distance from the plate 113. The end of the tubular waveguide 115 remote from the rectangular waveguides 100 and 102 is provided with a flange 126 having bolt-receiving holes 128 therein to facilitate attachment to an external waveguide (not shown).

The operation of the microwave power source of FIG. 1 to generate high power microwave oscillations at a preselected frequency will now be described. The control grids 17 of the electron guns 12 and 14 are normally maintained at a negative potential with respect to the cathodes 16 so that the electron beams are blocked, i.e., the flow of electrons along the slow-wave structures 26 and 28 is prevented. When it is desired that the power source 10 commence providing an output signal, either one, or both, of the pulse sources 24 and 25 are activated to apply a positive pulse to the associated control grid 17, thereby causing electrons to flow in a beam along the axis of the associated slow-wave structure 26 or 28. Electromagnetic wave energy due to amplification of noise modulation on the beam and launched onto the respective slow-wave interaction circuits 26 and 28 from the feedback waveguides 92 and 94 at the input ends of the slow-wave circuits is propagated in a serpentine path about the respective electron beams generated by the electron guns 12 and 14. Since the slow-wave circuits provide wave propagation paths considerably longer than the axial lengths of the circuits, the traveling waves effectively propagate at nearly the velocity of the electron beams. Interaction between beam electrons and the traveling waves cause velocity modulations and bunching of the electrons, resulting in a transfer of energy from the electron beams to the waves traveling along the slow-wave structures, thereby amplifying the traveling waves.

Amplifier electromagnetic wave energy is removed from the slow-wave structures 26 and 28 via the waveguides 66 and 68, respectively, at the collector ends of the slow-wave structures, and a portion of this output energy passes through the respective irises 74 and 76 to the longitudinal feedback waveguides 70 and 72. The feedback waves propagated along the waveguides 70 and 72 enter the resonant cavity 78 through the coupling irises 80 and 82, and since the cavity 78 is sharply resonant at a preselected frequency, only energy at this preselected frequency will be coupled out of the cavity via irises 88 and 90 to the waveguides 84 and 86 which feed the input ends of the respective slow-wave structures 26 and 28. Thus, only electromagnetic wave energy in the vicinity of the resonant frequency of the cavity 78 is fed back to the input ends of the slow-wave structures 26 and 28 for amplification therein, and hence the frequency of the amplified electromagnetic waves leaving the slow-wave structures via the waveguides 66 and 68 is determined by the resonant frequency of the cavity 78.

The portion of the electromagnetic wave energy in the waveguides 66 and 68 which is not applied to the cavity 78 propagates along the rectangular waveguides 100 and 102 to the tubular output waveguide 115. Since the cylindrical probe 116 and the triangular fins 118 and 120 divide the tubular waveguide 115 into a pair of semiannular waveguiding passageways (fed by the respective rectangular waveguides 100 and 102) which gradually taper into a single cylindrical waveguide, the output signals from the respective slow-wave structures 26 and 28 are readily combined to form a composite output signal.

Upon termination of the pulse or pulses from either or both of the sources 24 and 25, the control grid 17 of the associated electron gun is returned to a negative potential with respect to the cathode 16, thereby cutting off the associated electron beam and terminating the output signal from the slow-wave circuit along which that electron beam had been traveling. If both slow-wave circuits 26 and 28 are pulsed simultaneously, their respective output signals are combined in phase to provide a composite output signal of twice the instantaneous power achievable with either circuit operated individually. Alternatively, the slow-wave interaction circuits 26 and 28 may be pulsed sequentially so that a composite output signal of increased duty cycle or average power is produced.

Figure 5:
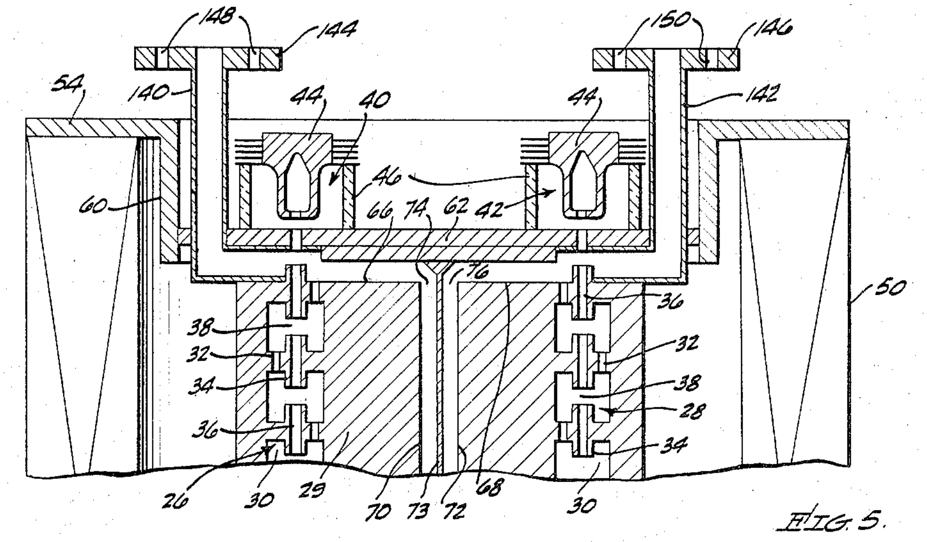
FIG. 5 is a longitudinal sectional view of a portion of a microwave power generating device according to another embodiment of the invention.
Figure 3:
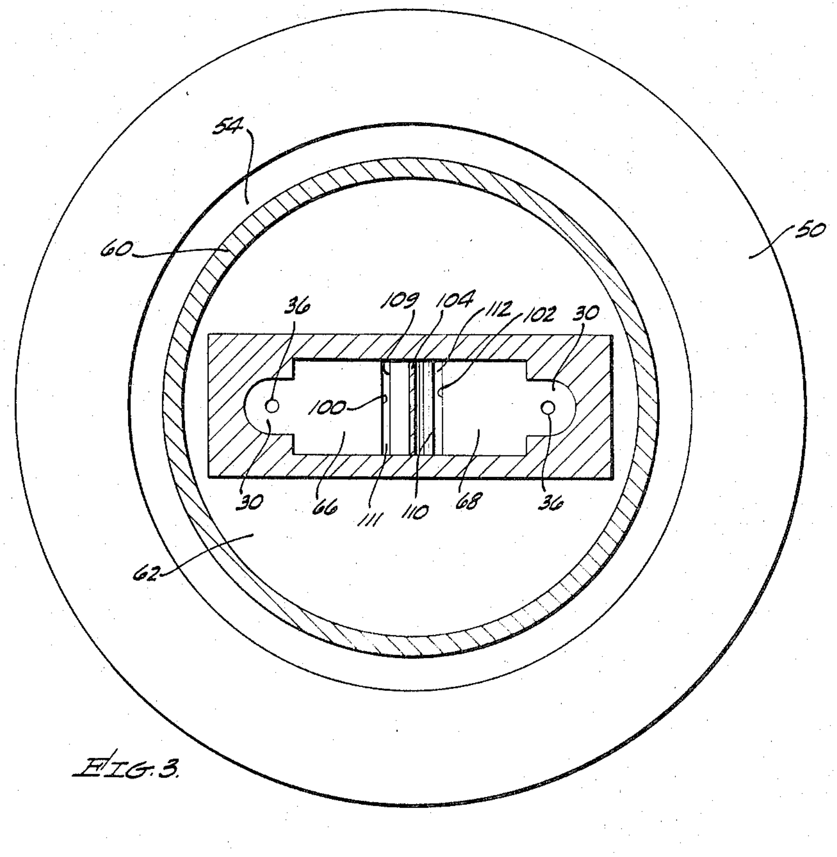
FIG. 3 is a cross-sectional view taken along line 3—3 of FIG. 1.

A microwave power source in which separate but coherent output signals are provided from the respective slow-wave interaction circuits may also be constructed in accordance with the principles of the present invention, an embodiment of this type being illustrated in FIG. 5. Except for the output circuitry, the embodiment of FIG. 5 may be identical to that of FIGS. 1–4, and those elements in the embodiment of FIG. 5 which are the same as corresponding elements in the embodiment of FIGS. 1–4 are designated by the same reference numerals as their counterpart elements. However, in the embodiment of FIG. 5 the transverse waveguides 66 and 68 coupled to the collector ends of the respective slow-wave structures 26 and 28 are made smaller than in the embodiment of FIGS. 1–4 and are arranged so that only the feedback energy is propagated through these waveguides. The remaining portions of the amplified electromagnetic waves at the collector ends of the slow-wave structures 26 and 28 are fed to respective like rectangular output waveguides 140 and 142 which extend radially outwardly from the collector ends of the respective slow-wave structures and then are bent 90° to extend longitudinally in the space between the annular portion 60 of the pole piece 54 and the respective collector arrangements 40 and 42. The ends of the waveguides 140 and 142 which project outwardly from the pole piece 54 are provided with respective flanges 144 and 146 which define bolt-receiving holes 148 and 150, respectively, to facilitate attachment of the waveguides 140 and 142 to external waveguiding circuitry (not shown).

It is pointed out that numerous modifications of the embodiments specifically shown and described herein are possible within the principles of the present invention. For example, although only two slow-wave interaction circuits are illustrated, any plurality of slow-wave circuits may be provided by symmetrically disposing such circuits about the axis of the device with a common feedback circuit provided along the axis, the number of slow-wave circuits being limited solely by the size of the individual circuits and the complexity of assembling the resultant device. Moreover, other types of slow-wave interaction circuits such as a helix circuit, a ring-bar circuit, or a disc-loaded waveguide may be employed instead of a coupled cavity circuit. In addition, other forms of a feedback circuit could be substituted for the resonant cavity 78. For example, such feedback circuits may take the form of a narrow band coupled cavity slow-wave circuit having very small coupling holes between cavities, or a ferrite device in which its ferromagnetic resonance properties are exploited by the longitudinal magnetic focusing field provided by the magnet 50.

Thus, while the present invention has been shown and described with reference to particular embodiments, those changes and modifications which are obvious to a person skilled in the art to which the invention pertains are deemed to lie within the purview of the invention.

What is claimed is:

1. A microwave power source for generating microwave signals at a preselected frequency comprising: means for providing a plurality of streams of electrons along a plurality of respective predetermined paths, a plurality of slow-wave structure means each disposed along and about one of said predetermined paths for propagating electromagnetic wave energy in such manner as to provide interaction between said electron streams and the respective electromagnetic wave energy propagated along the respective slow-wave structure means, a plurality of feedback means for removing electromagnetic wave energy from one region of each of said plurality of slow-wave structure means and for applying it to another region of each of said plurality of slow-wave structure means, respectively, said plurality of feedback means including common means resonant at said preselected frequency, and means for obtaining output electromagnetic wave energy at said preselected frequency from each of said plurality of slow-wave structure means.

2. A microwave power source according to claim 1 wherein means are provided for tuning said resonant means to vary its resonant frequency whereby said preselected frequency may be varied.

3. A microwave power source according to claim 1 wherein said means for obtaining output energy includes a separate waveguide coupled individually to each of said plurality of slow-wave structure means to provide separate output signals from the respective slow-wave structure means.

4. A microwave power source according to claim 1 wherein said means for obtaining output energy includes means for combining the individual output signals from the respective slow-wave structure means to provide a composite output signal.

5. A microwave power source for generating microwave signals at a preselected frequency comprising: means for providing a plurality of streams of electrons along a plurality of respective substantially parallel paths, a plurality of slow-wave structures having substantially the same electromagnetic wave propagating characteristics disposed substantially parallel to and coextensive with one another and along and about respective ones of said paths for propagating electromagnetic wave energy in such manner as to provide interaction between said electron streams and the respective electromagnetic wave energy propagated along the respective slow-wave structures, a plurality of feedback means for removing electromagnetic wave energy from one end of each of said plurality of slow-wave structures and for applying it to the other end of each of said slow-wave structures, respectively, said plurality of feedback means including a common cavity resonant at said preselected frequency, and means for obtaining output electromagnetic wave energy at said preselected frequency from said one end of each of said plurality of slow-wave structures.

6. A microwave frequency oscillator comprising: first electron gun means for providing a first stream of electrons along a first predetermined path, second electron gun means for providing a second stream of electrons along a second predetermined path, first slow-wave structure means disposed along and about said first path for propagating electromagnetic wave energy in such manner as to provide interaction between said first electron stream and the electromagnetic wave energy propagated along said first slow-wave structure means, second slow-wave structure means disposed along and about said second path for propagating electromagnetic wave energy in such manner as to provide interaction between said second electron stream and the electromagnetic wave energy propagated along said second slow-wave structure means, means sharply resonant at a preselected frequency, first and second waveguiding means for respectively propagating electromagnetic wave energy between one region of each of said first and second slow-wave structure means and said resonant means, third and fourth waveguiding means for respectively propagating electromagnetic wave energy between said resonant means and another region of each of said first and second slow-wave structure means, and means for obtaining output electromagnetic wave energy from each of said first and second slow-wave structure means.

7. A microwave frequency oscillator comprising: first electron gun means for providing a first stream of electrons along a first predetermined path, second electron gun means for providing a second stream of electrons along a second predetermined path substantially parallel to and coextensive with said first predetermined path, a first slow-wave structure disposed along and about said first path for propagating electromagnetic wave energy in such manner as to provide interaction between said first electron stream and the electromagnetic wave energy propagated along said first slow-wave structure, a second slow-wave structure having substantially the same electromagnetic wave propagating characteristics as said first slow-wave structure disposed along and about said second path and substantially parallel to and coextensive with said first slow-wave structure for propagating electromagnetic wave energy in such manner as to provide interaction between said second electron stream and the electromagnetic wave energy propagated along said second slow-wave structure, means defining a cavity which is sharply resonant at a preselected frequency, first and second waveguiding means for respectively propagating electromagnetic wave energy between one end of each of said first and second slow-wave structures and said resonant cavity, third and fourth waveguiding means for respectively propagating electromagnetic wave energy between said resonant cavity and the other end of each of said first and second slow-wave structures, and means for obtaining output electromagnetic wave energy from said one end of each of said first and second slow-wave structures.

8. A microwave frequency oscillator comprising: first electron gun means for providing a first stream of electrons along a first predetermined path, second electron gun means for providing a second stream of electrons along a second predetermined path, first slow-wave structure means disposed along and about said first path for propagating electromagnetic wave energy in such manner as to provide interaction between said first electron stream and the electromagnetic wave energy propagated along said first slow-wave structure means, second slow-wave structure means disposed along and about said second path for propagating electromagnetic wave energy in such manner as to provide interaction between said second electron stream and the electromagnetic wave energy propagated along said second slow-wave structure means, means sharply resonant at a preselected frequency, first and second waveguiding means for respectively propagating electromagnetic wave energy between one region of each of said first and second slow-wave structure means and said resonant means, third and fourth waveguiding means for respectively propagating electromagnetic wave energy between said resonant means and another region of each of said first and second slow-wave structure means, a first rectangular waveguide coupled to said first slow-wave structure means, a second rectangular waveguide coupled to said second slow-wave structure means and having its broad walls spaced from and disposed parallel to and co-extensive with the broad walls of said first rectangular waveguide, a tubular waveguide having an inner diameter greater than the distance between the outer broad walls of said first and second rectangular waveguides disposed in electromagnetic communication with said first and second rectangular waveguides with an end of said tubular waveguide abutting the ends of said first and second rectangular waveguides remote from said first and second slow-wave structure means and with an axial diametrical plane of said tubular waveguide being equidistant from and parallel to the inner broad walls of said first and second rectangular waveguides, an electrically conductive cylindrical probe of a diameter greater than the distance between said inner broad walls and less then the distance between said outer broad walls of said first and second rectangular waveguides coaxially disposed within said tubular waveguide with an end of said probe abutting said remote ends of said first and second rectangular waveguides, and first and second electrically conductive fins mounted in said axial diametrical plane between said cylindrical probe and said tubular waveguide on opposite sides of said probe, each said fin having a first longitudinal edge contacting said probe for a predetermined distance therealong and having a second longitudinal edge in contact with said tubular waveguide at its end abutting said rectangular waveguides, said second longitudinal edge extending toward said first longitudinal edge in a manner gradually reducing the width of said fin as a function of longitudinal distance from said remote ends of said rectangular waveguides.

References Cited by the Examiner

UNITED STATES PATENTS

| | | | |
|---|---|---|---|
| 2,842,667 | 7/1958 | Dench et al. | 331—82 X |
| 2,878,385 | 3/1959 | Koustas | 331—82 |
| 3,054,017 | 9/1962 | Putz | 315—39.3 X |

FOREIGN PATENTS

| | | |
|---|---|---|
| 706,001 | 3/1954 | Great Britain. |

OTHER REFERENCES

Reference Data for Radio Engineers, Fourth Edition, International Telephone and Telegraph Corporation, Copyright 1956, p. 399.

ROY LAKE, *Primary Examiner.*

J. B. MULLINS, *Assistant Examiner.*